United States Patent
Ross et al.

(10) Patent No.: US 8,141,045 B2
(45) Date of Patent: Mar. 20, 2012

(54) AUTOMATICALLY IDENTIFYING THE SOURCE OF COPIED SOFTWARE

(75) Inventors: Alexander Steven Ross, Toronto (CA); Neil Graham, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 11/956,567

(22) Filed: Dec. 14, 2007

(65) Prior Publication Data
US 2009/0158253 A1 Jun. 18, 2009

(51) Int. Cl.
*G06F 9/44* (2006.01)
(52) U.S. Cl. ........ 717/124; 717/120; 717/126; 717/127; 714/38.1; 714/25
(58) Field of Classification Search .................. None
See application file for complete search history.

(56) References Cited

U.S. PATENT DOCUMENTS

| | | | |
|---|---|---|---|
| 6,845,470 B2 * | 1/2005 | Austen et al. ............... 714/38.1 |
| 7,168,009 B2 * | 1/2007 | Darringer et al. ........... 714/38.1 |
| 7,405,660 B2 * | 7/2008 | Diorio et al. ................ 340/572.4 |
| 7,653,899 B1 * | 1/2010 | Lindahl et al. .............. 717/128 |
| 7,810,081 B2 * | 10/2010 | Dickenson et al. .......... 717/140 |
| 7,823,134 B2 * | 10/2010 | Agarwal et al. ............. 717/127 |
| 7,937,699 B2 * | 5/2011 | Schneider .................. 717/173 |
| 7,975,179 B2 * | 7/2011 | Chandrasekaran .......... 714/37 |
| 8,015,552 B1 * | 9/2011 | Lindahl et al. .............. 717/128 |
| 2006/0236203 A1 * | 10/2006 | Diorio et al. ................. 714/760 |
| 2007/0169004 A1 * | 7/2007 | Prakash ...................... 717/131 |
| 2008/0052695 A1 * | 2/2008 | Dickenson et al. ........ 717/151 |
| 2008/0109790 A1 * | 5/2008 | Farnham et al. ............ 717/128 |
| 2008/0162932 A1 * | 7/2008 | Challener et al. ........... 713/168 |
| 2008/0307267 A1 * | 12/2008 | Chandrasekaran .......... 714/38 |
| 2009/0138854 A1 * | 5/2009 | Mani ........................... 717/124 |
| 2011/0179484 A1 * | 7/2011 | Tuvell et al. ................ 726/22 |

OTHER PUBLICATIONS

Object-oriented programming—the problems of validation, author: Smith, M.D et al, source: IEEE, dated:Nov. 26, 1990.*

* cited by examiner

*Primary Examiner* — Chameli Das
(74) *Attorney, Agent, or Firm* — Yudell Isidore Ng Russell PLLC

(57) ABSTRACT

A method, system, and computer-usable medium for automatically identifying the source of copied software. A single identifying marker can be embedded in a common code base associated with different software application products. A suspected copy of a product can be fed to an automated tool, which extracts the type of object code, which is then scanned to determine the identifying marker. The automated tool can therefore identify the exact product and version of the suspected copy utilizing the identifying marker and the type of object code without the need for labor-intensive modification of the common code base and product-specific markers.

12 Claims, 5 Drawing Sheets

AUTOMATICALLY IDENTIFYING THE SOURCE OF COPIED SOFTWARE

TECHNICAL FIELD

Embodiments are generally related to data-processing systems and methods. Embodiments also relate in general to the field of computers and similar technologies, and in particular to software utilized in this field. In addition, embodiments relate to methods and systems for automatically identifying the source(s) of copied software.

BACKGROUND OF THE INVENTION

Modern computing systems often utilize large-scale and/or complex software systems. Typical examples of these software systems include operating systems, application servers, and other complex software applications. A key factor in developing and successfully marketing a complex software application is maintaining the quality of the application through a quality control process. A software application typically includes a common code base; that is, one that is shared by as many programmers on a team as possible. The common code base can be used to generate an object code that may be run on each of the computing programs of interest to the programmers. This technique facilitates the ease with which a program may be tested, enhances the likelihood that it will behave similarly on all computing platforms of interest, and reduces the efforts the team of programmers will require to maintain and enhance the program.

When examining a suspected copy of a product derived from a common code base of a software application, it is often difficult to determine from which specific product the copy has been made, especially when there are multiple versions of each product. Hence, it is especially difficult to ensure that the product code is identical to the suspicious code, because the code can be written in different languages for different computing platforms. The tracking of software source code becomes much more critical during the development of large-scale, complex software systems by multiple software developers in a distributed software development system.

The majority of prior art methods utilized with respect to many large software projects simply retain a product specific marker for each different product on each computing platform. This approach requires a great deal of self-discipline on the part of the developers and often leads to mistakes and inefficiencies, since it requires code to be inserted that is specific to each computing platform of interest. Another disadvantage of this method is that repeating this approach for each and every version of the software product that has been created is time consuming and labor intensive.

Based on the foregoing it is believed that a need exists for an improved method and system for automatically identifying the exact product and version of a suspected software copy.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for protecting software from piracy.

It is an additional aspect of the present invention to provide for an improved method, system and computer-usable medium for automatically identifying the exact product and version of a suspected copy of software.

The aforementioned aspects and other objectives and advantages can now be achieved as described herein. A method and system for identifying the source of copied software includes a single identifying marker that can be embedded in a common code base associated with different application products. A suspected copy of a product can be fed to an automated tool, which then extracts the type of object code, and the code can be scanned in order to determine the identifying marker. The automated tool can be utilized identify the exact product and version of the suspected copy utilizing the identifying marker and the type of object code.

The unique identifying marker can be automatically applied to the common code base associated with the particular software. The suspected copies of the software generated from the common code base possess the same identifying marker thereon. The automated tool can identify the exact product and version of the suspected copy without the need for labor-intensive modification of the common code base and the use of product-specific markers. The method and system disclosed in greater detail herein can be utilized for software design and development while providing an efficient technique for identifying software pirates utilizing the identifying marker.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
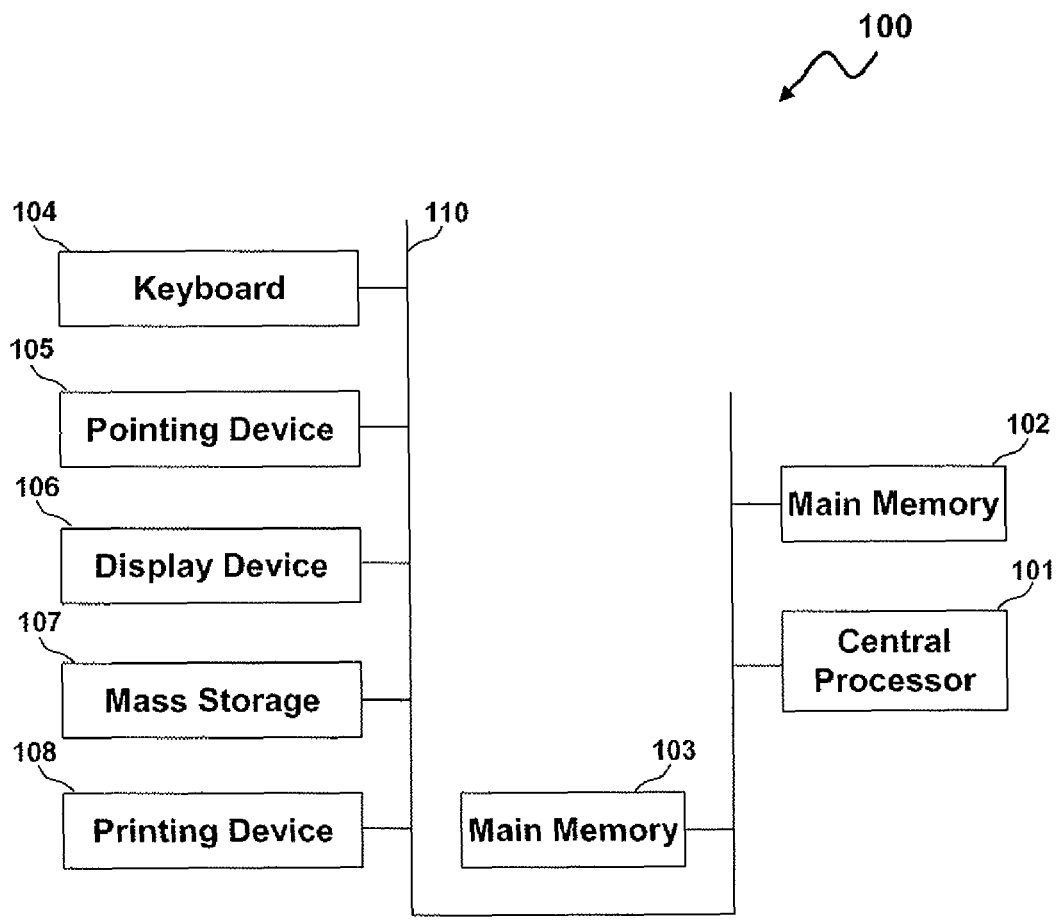
FIG. 1 illustrates a schematic view of a computer system in which the present invention may be embodied.

As depicted in FIG. 1, the present invention may be embodied on a data-processing system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing system 100 as desired. As illustrated, the various components of the data-processing system 100 communicate through a system bus 110 or similar architecture.

Figure 2:
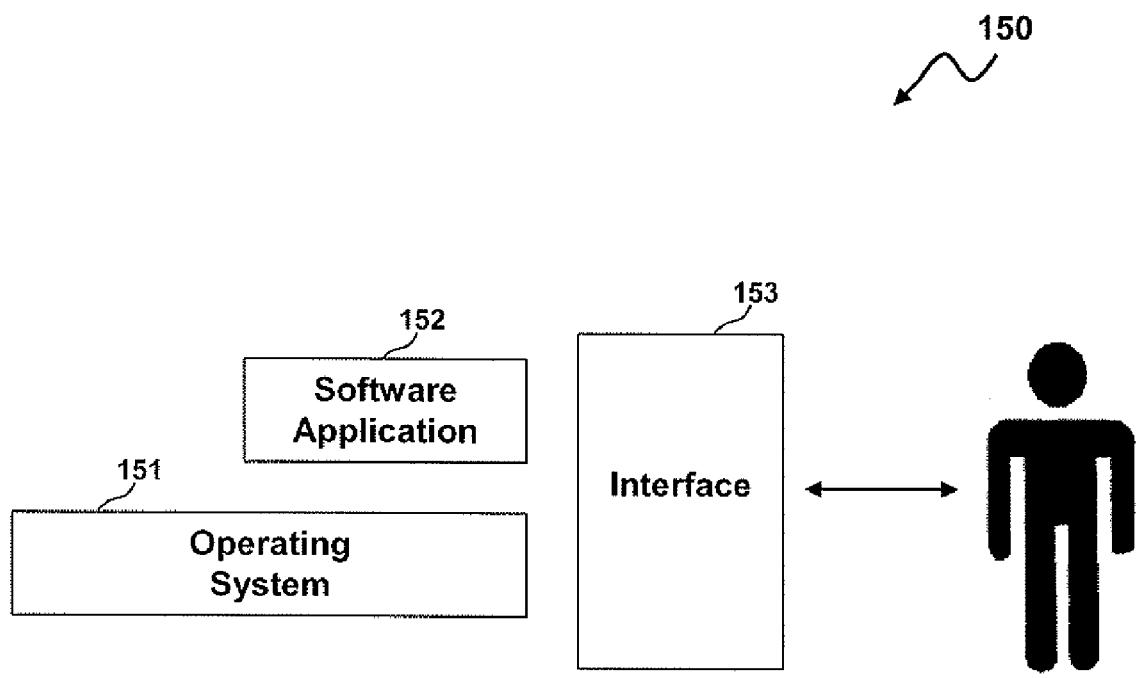
FIG. 2 illustrates a schematic view of a software system including an operating system, application software, and a user interface for carrying out the present invention.
Figure 5:
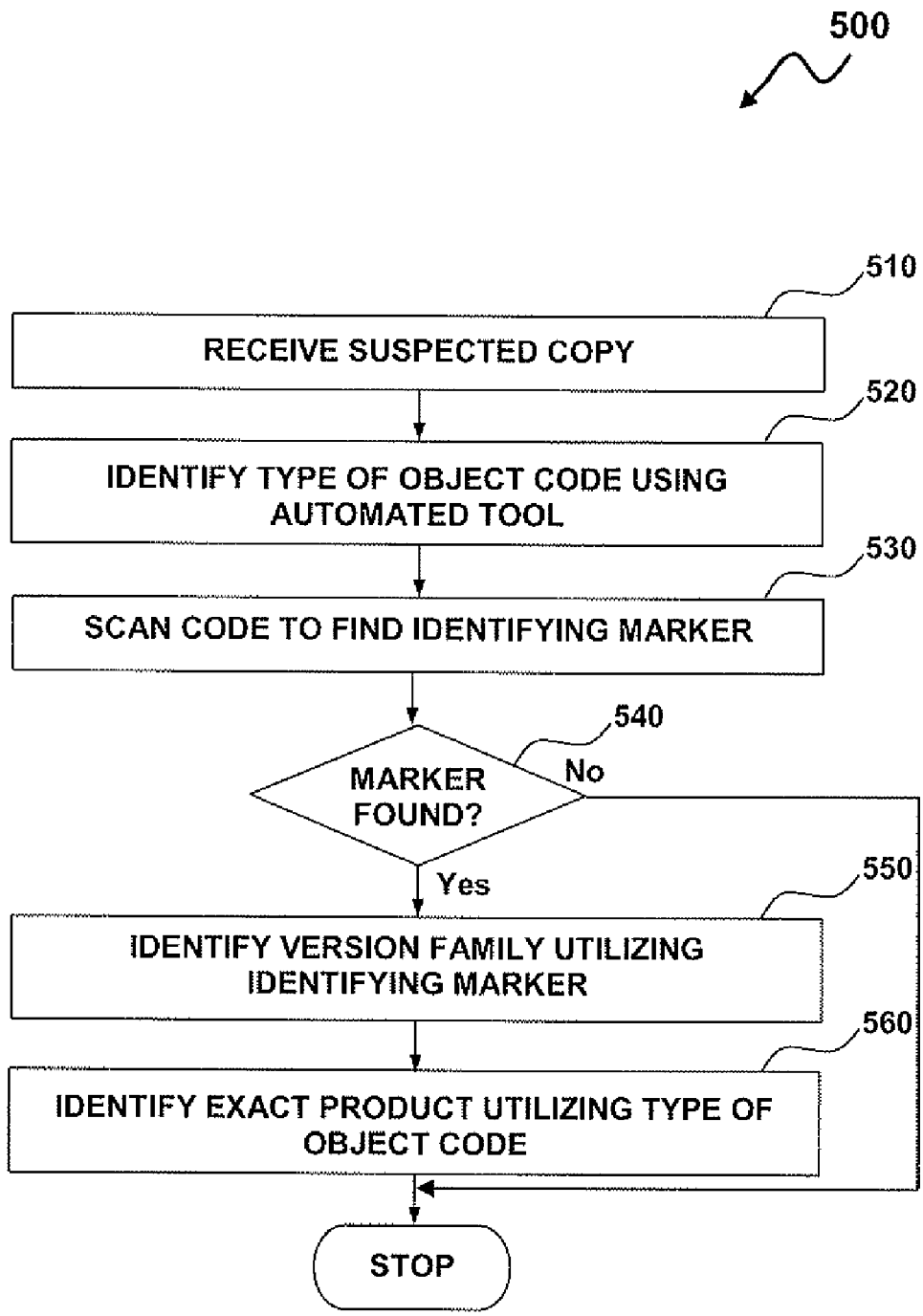
FIG. 5 illustrates a detailed flow chart of operations illustrating logical operational steps of a method for identifying the exact product and version of a suspected copy of software, in accordance with a preferred embodiment.

Illustrated in FIG. 2, a computer software system 150 can be provided for directing the operation of the data-processing system 100. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing system 100. The data-processing system 100 generally receives user commands and data through user interface 153. Such inputs may then be acted upon by the data-processing system 100 in accordance with instructions from operating module 151 and/or application module 152. The interface 153, which is preferably a graphical user interface (GUI), also serves to display results, whereupon the user may supply additional inputs or terminate the session. In one particular embodiment, operating system 151 and interface 153 can be implemented in the context of a "Windows" environment. Application module 152, on the other hand, can include instructions, such as the various operations described herein with respect to the respective method 500 of FIG. 5 depicted and described in greater detail herein.

Note that the following description is presented with respect to embodiments of the present invention, which can be embodied in the context of a data-processing system such as data-processing system 100 and computer software system 150 depicted in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 3:
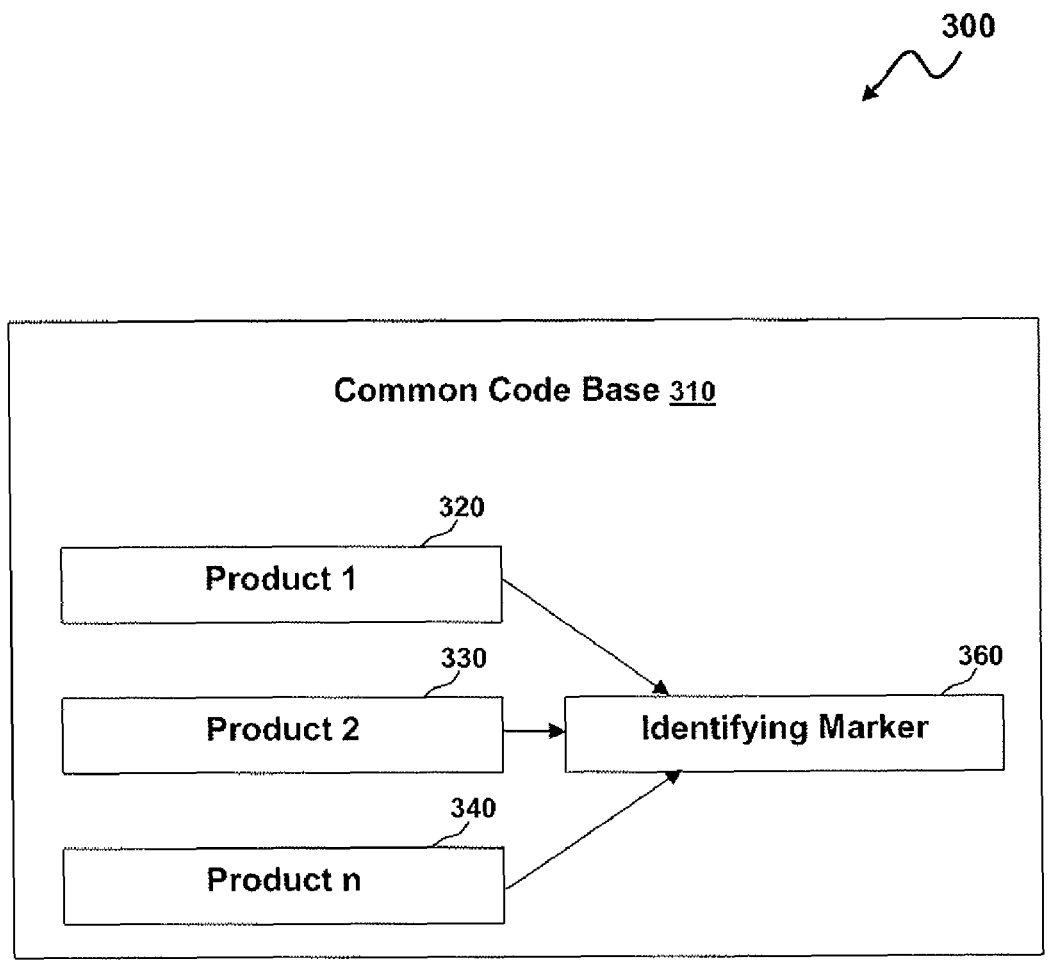
FIG. 3 illustrates a block diagram of a software application associated with a common code base and different products, which can be implemented in accordance with a preferred embodiment.

Referring to FIG. 3 a block diagram of a software application 300 associated with a common code base and different products is illustrated, which can be implemented in accordance with a preferred embodiment. The common code base 310 can include different products such as product 1, product 2 and product n, as indicated by reference numerals 320, 330 and 340. Each product 320, 330 and 340 generally includes multiple versions, which are usually numbered in sequence according to a stage of the product development process of the same software application 300, and are given to more effectively manage the software application 300. The computer software system 150 of FIG. 2 can be utilized to store each of the products 320, 330 and 340 and their respective versions within the system memory 102. The products 320, 330 and 340 can be derived from the common code base 310, which may include an identifying marker 360.

Figure 4:
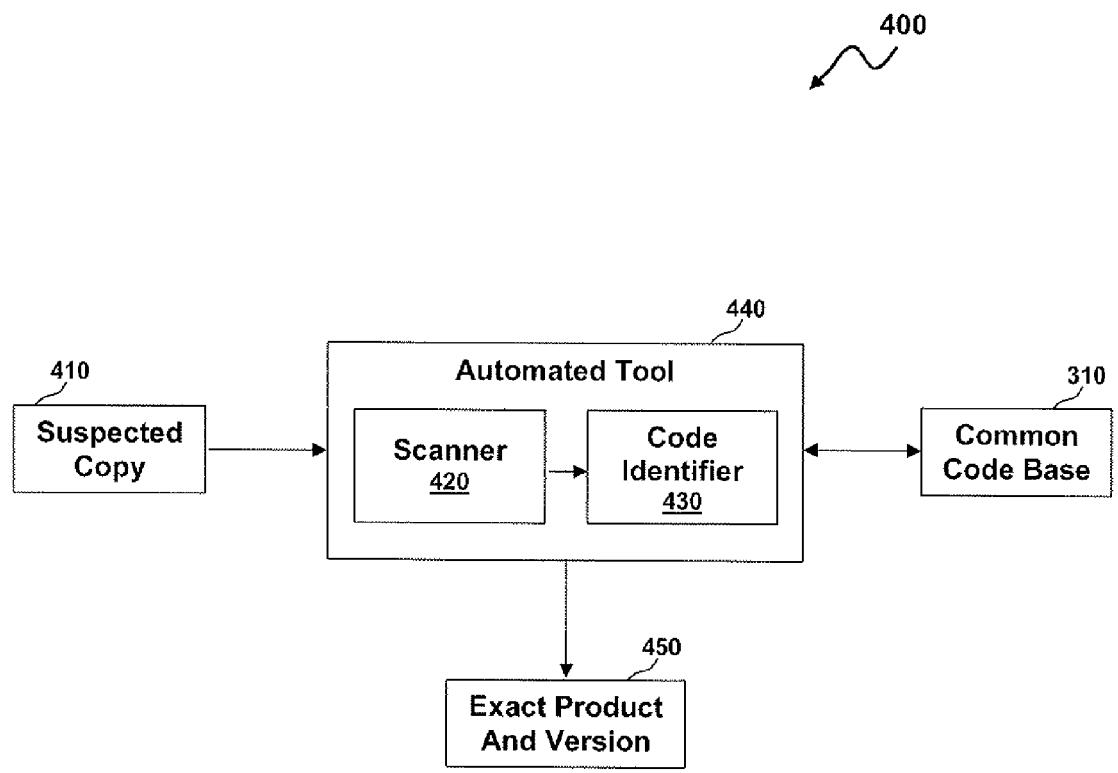
FIG. 4 illustrates a block diagram of an automated tool for identifying the exact product and version of a suspicious code, in accordance with a preferred embodiment.

The unique identifying marker 360 embedded in the common code base 310 can be assigned to a particular authorized copy of the software application 300. The identifying marker 360 is in essence a serial number or identifier for the products associated with the common code base 310. As illustrated in FIG. 4, the common code base 310 can be stored in, for example, the system memory 102 depicted in FIG. 1 for storing and maintaining code lines, and a means for organizing, accessing and maintaining common code base 310.

Referring to FIG. 4, a block diagram of an automated tool system 400 for identifying the exact product and version of a suspicious code is illustrated, implemented in accordance with a preferred embodiment. System 400 generally includes an automated tool 440 that incorporates the use of a scanner 420 and a code identifier 430 for identifying the source of a suspected copy 410. The suspected copy 410 can be fed to the automated tool 440. The suspected copies, such as copy 410 of the software application 300 generated from the common code base 310, possesses the same identifying marker 360 thereon. The code identifier 430 in the automated tool 440 extracts the type of object code of the suspected copy 410. The suspected copy 410 can be scanned utilizing the scanner 420 in order to find the identifying marker 360. The identifying marker 360 is not readily apparent to the casual observer and the unique identifying marker 360 can be extracted from the code by the high resolution scanner 420 associated with the automated tool 440.

The unique identifying marker 360 can be added to the common code base 310 produced by a specific software application such as application 300 and can be associated with the versions of the products such as 320, 330 and 340 derived from the common code base 310 as depicted in FIG. 3. This can make it possible to detect the version of the particular suspected copy 410. The automated tool 400 can identify the exact product and version 450 of the suspected copy 410 utilizing the identifying marker 360 and the type of object code without the need for labor-intensive modification of the common code base to use product-specific markers.

Referring to FIG. 5, a detailed flow chart of operations illustrating logical operational steps of a method 500 for identifying exact product and version of a suspected copy of software is illustrated, in accordance with a preferred embodiment. Note that the method 500 depicted in FIG. 5 can be implemented in the context of a software module such as, for example, the application module 152 of computer software system 150 depicted in FIG. 2.

The generally methodology disclosed herein involves receiving a suspected copy of a software application, and then identifying a particular type of object code for the suspected copy. Thereafter, the suspected copy can be scanned to extract and identify an identifying marker in the suspected copy, wherein the identifying marker automatically identifies a particular version family of the suspected copy with respect to a common code base of the software application. Finally, the particular type of object code and the particular version family can be used to determine an exact product of the suspected copy utilizing an automated tool.

Thus, a suspected copy 410 can be loaded to (i.e. received by) the automated tool 440, as depicted at block 510. Thereafter, as indicated at block 520, the type of object code of the suspected copy 410 can be identified using a code identifier 430. The code can be scanned by the scanner 420 associated with the automated tool 440 to find the identifying marker 360, as shown at block 530.

A test can then be performed as depicted at block 540 to determine whether or not the identifying marker 360 has been found. If the identifying marker 360 is found, then the version family of the suspected copy 410 can be identified utilizing the identifying marker 360 by the automated tool 440, as depicted at block 550. Next, as described at block 560, the exact product of the suspected copy 410 can be identified utilizing the object code. Otherwise, the process can be terminated. The method 500 disclosed in greater detail herein can be utilized for software design and development and can be employed to readily identify software pirates. It can be appreciated at least one some of the steps of the method 500 may be carried out in a different order from the order depicted in FIG. 5, so long as the functionality is preserved, without departing from the spirit and scope of the present invention.

It should be understood that at least some aspects of the present invention may alternatively be implemented in a computer-useable medium that contains a program product. For example, the processes depicted in FIG. 5 herein can be implemented in the context of such a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the method 500 described herein, and in particular as shown and described in FIG. 5 can be deployed as process software in the context of a computer system or data-processing system as that depicted in FIG. 1-2.

Based on the foregoing, it can be appreciated that the embodiments described herein offer several advantages, such as, for example, a labor saving approach. Another significant advantage of the methodology, system and computer-usable medium described herein is its simplicity, and the consequently small computational requirements that it would impose on a detection tool. One can imagine, for instance, a web crawler employing the disclosed embodiments in the context of a website controlled by a company without a license to a particular web application or applet, but which is suspected of using it for any reason; neither the site being scanned nor the scanner should notice the load. This may not be true of other more complex anti-piracy techniques such as those involving watermarking etc.

While "[t]he identifying marker 360 [may not be] readily apparent to the casual observer" as discussed earlier, it could easily be argued that pirates are often not casual observers, and that it would be easy to defeat the disclosed embodiments by removing the marker. However, this is not actually the case. The common code to which the marker applies could be easily written so as to depend explicitly on the presence of the marker; that is, the products generated from the common code would not operate, correctly or at all, if the marker were tampered with.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implementable method executable by a data-processing system for automatically identifying a source of copied software, comprising:
   receiving a suspected copy of a software application;
   identifying a particular type of object code for said suspected copy;
   scanning said suspected copy to identify an identifying marker in said suspected copy, wherein said identifying marker automatically identifies a particular authorized copy of said software application and a particular version family of said suspected copy of the software application according to a stage of the product development process with respect to a common code base of said software application;
   in response to identifying an identifying marker in said suspected copy, extracting said identifying marker in said suspected copy; and
   the data processing system automatically determining an exact product of said suspected copy using said identified particular type of object code and said identified particular version family, wherein one or more products are associated with said common code base;
   wherein said common code base to which said identifying marker applies is capable of being written to depend explicitly on the presence of said identifying marker, wherein any products generated from said common code are inhibited from being operable if said identifying marker is subjected to tampering.

2. The computer-implementable method of claim 1, wherein said identifying marker is associated with said particular version family of said common code base.

3. The computer-implementable method of claim 1 further comprising embedding said identifying marker in said common code base of said software application associated with a plurality of products.

4. The computer-implementable method of claim 1, wherein said suspected copy of said software application generated from said common code base possesses said identifying marker.

5. A data-processing system, comprising:
   a processor; and
   a computer-usable medium embodying computer program code, said computer-usable medium being coupled to said processor, said computer program code comprising instructions executable by said processor and configured to enable the data processing system to:
   receive a suspected copy of a software application;
   identify a particular type of object code for said suspected copy;
   scan said suspected copy to identify an identifying marker in said suspected copy, wherein said identifying marker automatically identifies a particular authorized copy of said software application and a particular version family of said suspected copy of the software application according to a stage of the product development process with respect to a common code base of said software application;

in response to identifying an identifying marker in said suspected copy, extract said identifying marker in said suspected copy; and automatically determine an exact product of said suspected copy using said identified particular type of object code and said identified particular version family, wherein one or more products are associated with said common code base;

wherein said common code base to which said identifying marker applies is capable of being written so as to depend explicitly on the presence of said identifying marker, wherein any products generated from said common code are inhibited from operating if said identifying marker is subjected to tampering.

6. The data-processing system of claim 5, wherein said instructions further comprise instructions that enable the data processing system to:

embed said identifying marker in said common code base of said software application associated with a plurality of products.

7. The data-processing system of claim 5, wherein said identifying marker is associated with said particular version family of said common code base.

8. The data-processing system of claim 5, wherein said suspected copy of said software application generated from said common code base possesses said identifying marker.

9. A computer-usable storage medium embodying computer program code, said computer program code comprising computer executable instructions configured for:

receiving a suspected copy of a software application;

identifying a particular type of object code for said suspected copy;

scanning said suspected copy to identify an identifying marker in said suspected copy, wherein said identifying marker automatically identifies a particular authorized copy of said software application and a particular version family of said suspected copy of the software application according to a stage of the product development process with respect to a common code base of said software application;

in response to identifying an identifying marker in said suspected copy, extracting said identifying marker in said suspected copy; and automatically determining an exact product of said suspected copy using said identified particular type of object code and said identified particular version family, wherein one or more products are associated with said common code base;

wherein said common code base to which said identifying marker applies is capable of being written so as to depend explicitly on the presence of said identifying marker, wherein any products generated from said common are inhibited from operating if said identifying marker is subjected to tampering.

10. The computer-usable storage medium of 9, wherein said identifying marker is associated with said particular version family of said common code base.

11. The computer-usable storage medium of claim 9, wherein said embodied computer program code further comprises computer executable instructions configured for:

embedding said identifying marker in said common code base of said software application associated with a plurality of products.

12. The computer-usable storage medium of claim 9, wherein said suspected copy of said software application generated from said common code base possesses said identifying marker.

* * * * *